May 14, 1929.  W. J. GIBBS  1,712,762
CONVEYER MECHANISM
Filed May 27, 1926
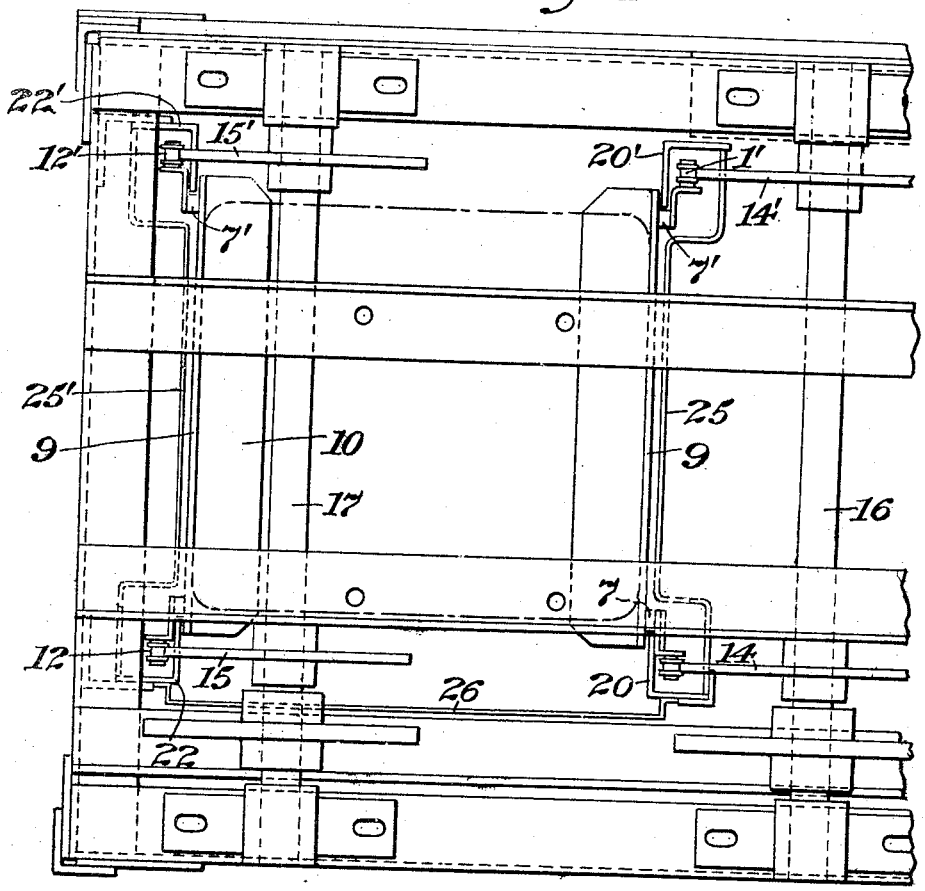
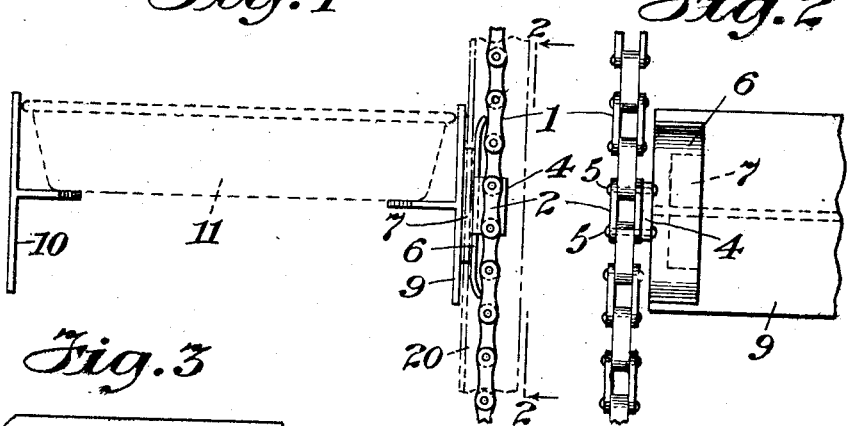
INVENTOR
William J. Gibbs
BY
William A Hughes
ATTORNEY Patented May 14, 1929.

1,712,762

UNITED STATES PATENT OFFICE.

WILLIAM J. GIBBS, OF BROOKLYN, NEW YORK.

CONVEYER MECHANISM.

Application filed May 27, 1926. Serial No. 112,069.

The present invention relates to conveying apparatus and mechanisms of the elevator type and particularly of the type which embodies endless chains or belts and is adapted to carry loads up or down or in both directions simultaneously. The invention further relates to means for guiding the endless conveying members and for supporting them and their load laterally and to new and novel casing structure for closing about the conveyer.

Various objects and advantages of the invention will be obvious from the following particular description of a form of mechanism embodying the invention or from an inspection of the accompanying drawings, and the invention also consists in certain new and novel features of construction and combinations of parts hereinafter set forth and claimed.

In the following description and in the claims parts will be identified by specific names for convenience, but they are intended to be as generic in their application to similar parts as the art will permit.

In the accompanying drawings I have shown for purposes of illustration one form of mechanism embodying the invention, in which Fig. 1 is an end elevation view showing somewhat diagrammatically a section of conveyer chain, load supporting means mounted thereto by means adapted for cooperation with guiding and lateral support means, Fig. 2 is an elevation view looking in the direction of the arrows 2—2 of Fig. 1, Fig. 3 is a plan view of the structure of Figs. 1 and 2 which shows in full lines a section of a channel member (shown in dotted lines in Figs. 1 and 2) one of whose side members serves as a guide for the conveyer structure shown and which cooperates therewith to provide lateral support therefor; and in dotted lines there is diagrammatically shown protective partition members extending from the channel member to corresponding channel members not shown but similarly positioned about other parts of the conveyer mechanism, and Fig. 4 is a plan view showing somewhat diagrammatically part of a conveyer mechanism and particularly showing the relation of the guiding and lateral support members to the load support members and also the partitioning members.

The invention herein described is applicable to a conveyer mechanism such as is described in my Patent No. 1,504,886, issued August 12, 1924, to which reference is hereby made, the present disclosure being confined to such parts and combinations as are considered necessary to properly set forth the invention.

In the drawings the sprocket chain 1 has mounted to the link 2 thereof the member 4 by the pivot pins 5, 5 of said link. Said member 4 carries the member 6 which is formed integral therewith and which extends at right angles therefrom away from said chain 1, is of appreciable length and has its ends curved back. Said member 6 at its edge away from member 4 carries the spacer member 7 which is fixed thereto as by riveting, bolting, or spot welding. Fixed to the other face of member 7 and extending to a corresponding member 7' on chain 1' (see Fig. 4) is the T-shaped load support flight 9 which cooperates with a corresponding flight 10 in supporting a load 11, such as a tray, pan or the like.

In Fig. 4 the set of chains 1, 1' which carry a series of flights 9 cooperates with the set of chains 12, 12' which carry the set of flights 10 and are caused to travel together upwardly or downwardly in manner well known in this art by means of the sprocket wheels 14, 14' and 15, 15' which are mounted on the shafts 16 and 17 respectively and driven by a suitable source of power not shown.

The angle members 20, 20' and 22, 22' extend about two sides of the respective chain portions 1, 1', 12 and 12' with one of the side members thereof positioned between the backs of the flights 9, 10 and the members 6, 6' which are on that part of the chains, the members 7, 7' serving to space the flights and members 6, 6' apart to provide slot which rides over said side member of the angle. The whole angle forms a guard about the vertically extending part of the chain which rides through, and preferably the angle is provided to extend throughout the vertical part of the chains between top and bottom sprockets, being properly mounted by means not shown to the frame work of the conveyer. Between the angles 20 and 20' there extends the sheet iron partition 25 which is formed at desired points about the space through which the members 4 and 6 move and close to and along the backs of the flights 9, 9 where it serves as a guard wall for trays, pans, etc., on said flight and for food, dishes, or other goods on said trays, etc. A like partition member 25' extends between angles 22 and 22'. The space between angles 20 and 22 is closed by a similar partition 26. The space between angles 20' and 22' which is at the front of the conveyer may be likewise closed, except at loading and unloading points, by a similar partition.

In the use of the apparatus and mechanism of this invention the flights 9 and 10 are moved up or down in pairs by their respective chains 1 and 1', and 12 and 12' in a manner well known in the art, said flights are made to carry loads such as the tray or pan 11 which extends between a cooperating pair of flights. Such a load tends to cause the flights and their pairs of chains to bend away from each other, but the back of the flights and the members 6, 6' which with respective members 7, 7' form angles which ride against a side member of a respective angle member 20 and prevent excessive movement of members of loaded pairs of flights away from each other. The angle members also serve as protective shields about the chains and also as supports for the partition or closure members which extend between them.

The guiding means, mounted outside the ends of the flights as above described, is particularly useful in conveyers comprising a chain which passes over sprocket wheels with a carrying element such as a flight 9 hereof on the inside of the chain, as does one of the chains in the conveyer shown in my said Patent No. 1,504,886. The advantage lies in that the guiding means does not interfere with the carrying element when the latter is on the inside of the chain and the form of the latter does not have to be modified in order to avoid interference between the carrying element and the sprocket, such as heretofore was necessary.

While I have shown and described and have pointed out in the annexed claims certain novel features of the invention, it will be understood that various omissions, substitutions and changes in the forms and details of the device illustrated and in its operation and use may be made by those skilled in the art without departing from the spirit of the invention.

Having thus described my invention what I claim and desire to secure by Letters Patent is:

1. In a conveying mechanism comprising a pair of flexible transmission members and a spanning member therebetween adapted to move a load, in combination, connecting members between each of said transmission members and said spanning member including one which for a part of its length extends over said spanning member and defines therewith a guide channel.

2. In a conveying mechanism comprising a pair of flexible transmission members and a spaning member therebetween adapted to move a load, in combinaiton, a connecting member between each of said transmission members and a respective spanning member, a part of said connecting member between the transmission member and the spanning member being shaped to form a guide channel with a part of said spanning member, and a member in each of said channels extending into close proximity with the sides thereof and adapted to cooperate with said channel to guide the spanning member and to hold it against excessive movement when moving a load.

3. In a conveying mechanism comprising a pair of vertically extending flexible transmission members and a spanning member therebetween adapted to support and carry a load, in combination, a connecting member between each of said transmission members and a respective spanning member, a part of said connecting member between the transmission member and the spanning member being shaped to form a guide channel with its respective part of said spanning member, and a member in each of said channels adapted to cooperate with a part of said channel to guide the spanning member and to hold it against excessive lateral movement when carrying a load.

4. In a conveying mechanism comprising a pair of flexible transmission members and a spanning member therebetween adapted to move a load, in combination, a connecting member between each of said transmission members and a respective spanning member, a part of said connecting member between the transmission member and the spanning member being shaped to form a guide channel with a part of said spanning member, and a member in each of said channels adapted to cooperate with said channel to guide the spanning member, said guide member being part of an angle iron which extends along two sides of said flexible transmission member along a part of its length.

5. In a conveying mechanism comprising a pair of flexible transmission members and a spanning member therebetween adapted to move a load, in combination, a connecting member between each of said transmission members and a respective spanning member, said connecting member between its connecting portions being shaped to form a guide channel with a part of said spanning member, and a member in each of said channels adapted to cooperate with said channel to guide the spanning member, said guide member being part of an angle iron which extends along two sides of said flexible transmission member along a part of its length and sheet iron partition members extending between said angle irons to form enclosing walls about moving parts of the mechanism.

6. In a conveying mechanism comprising a pair of flexible transmission members and a spanning member therebetween adapted to move a load, in combination, a connecting member between each of said transmission members and a respective spanning member, said connecting member between its connecting portions being shaped to form a guide channel with a part of said spanning member, and an angle iron in each of said channels adapted to cooperate with said channel to guide the spanning member and sheet iron partition members extending between said angle irons to form enclosing walls about moving parts of the mechanism.

7. In a conveying mechanism comprising a pair of flexible transmission members and a spanning member attached therebetween by connecting members, at least one of said connecting members being attached to the spanning member near one end of the latter and extending toward said end for a part of its length over the spanning member to define a guide channel therewith, the transmission member attached near said end being positioned outwardly therebeyond.

In testimony whereof I have hereunto set my hand.

WILLIAM J. GIBBS.